US011319459B2

(12) United States Patent
Chevalier et al.

(10) Patent No.: US 11,319,459 B2
(45) Date of Patent: May 3, 2022

(54) CURABLE COMPOSITION AND COATED SUBSTRATE

(71) Applicant: DOW SILICONES CORPORATION, Midland, MI (US)

(72) Inventors: Pierre Chevalier, Lille (FR); Zhanjie Li, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 341 days.

(21) Appl. No.: 16/484,586

(22) PCT Filed: Feb. 9, 2018

(86) PCT No.: PCT/US2018/017565
§ 371 (c)(1),
(2) Date: Aug. 8, 2019

(87) PCT Pub. No.: WO2018/148504
PCT Pub. Date: Aug. 16, 2018

(65) Prior Publication Data
US 2019/0367744 A1    Dec. 5, 2019

(30) Foreign Application Priority Data

Feb. 10, 2017  (EP) ..................... 17305156

(51) Int. Cl.
| | |
|---|---|
| *C09D 183/04* | (2006.01) |
| *C08K 3/11* | (2018.01) |
| *C09J 7/40* | (2018.01) |
| *C09D 5/20* | (2006.01) |
| *C08L 83/04* | (2006.01) |

(52) U.S. Cl.
CPC .............. *C09D 183/04* (2013.01); *C08K 3/11* (2018.01); *C08L 83/04* (2013.01); *C09D 5/20* (2013.01); *C09J 7/401* (2018.01); *C09J 2483/005* (2013.01)

(58) Field of Classification Search
CPC .................................................... C08L 83/04
USPC ................................................. 525/477–479
See application file for complete search history.

(56) References Cited

U.S. PATENT DOCUMENTS

| | | | |
|---|---|---|---|
| 5,017,654 A | | 5/1991 | Togashi et al. |
| 5,364,922 A | * | 11/1994 | Bilgrien ................. C08L 83/04 528/15 |
| 5,380,812 A | * | 1/1995 | Lutz ....................... C08L 83/04 528/15 |
| 6,307,082 B1 | | 10/2001 | Klein et al. |
| 2005/0256286 A1 | | 11/2005 | Asch et al. |
| 2009/0069524 A1 | | 3/2009 | Hofmann et al. |
| 2011/0027584 A1 | | 2/2011 | Zhong et al. |
| 2014/0329099 A1 | * | 11/2014 | Marrot ................... C09K 15/12 428/447 |
| 2015/0045503 A1 | | 2/2015 | Mueller |
| 2016/0319086 A1 | | 11/2016 | Pouget et al. |
| 2020/0346197 A1 | * | 11/2020 | Girolami ............. B01J 31/1608 |

FOREIGN PATENT DOCUMENTS

| | | |
|---|---|---|
| CN | 1656152 A | 8/2005 |
| CN | 1871325 A | 11/2006 |
| EP | 0300643 A2 | 1/1989 |
| EP | 1031603 A2 | 8/2000 |
| EP | 1892327 A1 | 2/2008 |
| JP | 2009533503 A | 9/2009 |
| JP | 2012188562 A | 10/2012 |
| JP | 2015503648 A | 2/2015 |
| JP | 2016151010 A | 8/2016 |
| KR | 1020160102006 A | 8/2016 |
| WO | 2005044950 A1 | 5/2005 |
| WO | 2013070350 A1 | 5/2013 |

OTHER PUBLICATIONS

"Optimizing Ligand Structure for Low-loading and Fast Catalysis for Alkynyl-alcohol and Amine Cyclization" authored by Stubbs et al., and published in Dalton Transactions (2019) 49, 7928-7937.*
"Mechanism Investigations of the Endo Cycloisomerization of Alkynols through Isolation and Characterization of Ruthenium Complexes from the Reactions of Alkynes with a Ruthenium Complex" authored by Liu and published in Organometallics (2011) 20, 2571-2580.*
International Search Report for PCT/US2018/017565 dated Apr. 24, 2018, 4 pages.
Machine assisted English translation of JP2016151010A obtained from https://patents.google.com/patent on Oct. 19, 2020, 13 pages.
Machine assisted English translation of EP1892327A1 obtained from https://patents.google.com on Nov. 19, 2019, 15 pages.
Machine assisted English translation of JP2012188562A obtained from https://patents.google.com on Nov. 19, 2019, 12 pages.
P. Chevalier, I. McKinnon, "Ring-Opening Olefin Metathesis Polymerisation (ROMP) as a Potential Cross-Linking Mechanism for Siloxane Polymers", J. Inorg. Organomet. Polym., 9 (3), 1999, 151-164.
R.H. Grubbs et al., JACS, 114 (10), 3974-3975.

(Continued)

*Primary Examiner* — Marc S Zimmer
(74) *Attorney, Agent, or Firm* — Warner Norcross + Judd LLP

(57) ABSTRACT

A curable composition is disclosed. The curable composition comprises: (A) an organopolysiloxane containing at least two silicon-bonded aliphatically unsaturated groups per molecule; (B) an organohydrogensiloxane containing at least two silicon-bonded hydrogen atoms per molecule; (C) a hydrosilylation-reaction catalyst; (D) a hydrosilylation-reaction inhibitor; and (E) a catalyst different from component (C) and capable of deactivating the (D) hydrosilylation-reaction inhibitor at an elevated temperature of from 50 to 120 C such that components (A) and (B) react in the presence of at least component (C) at the elevated temperature. A process of preparing a coated substrate with the curable composition is also disclosed.

9 Claims, No Drawings

(56) References Cited

OTHER PUBLICATIONS

R.H. Grubbs et al., Angew. Chem., 41 (21), 4035-7.
S.P. Nolan et al., JACS, 121 (12), 2674-8.
R.H. Grubbs et al., Tetra. Lett., 40 (12), 2247-50.
A. Fürstner et al., Tetra. Lett., 40 (26).
A.H. Hoveyda et al., JACS, 121 (4), 791-9.
Blechert et al., Tetra. Lett., 41 (51), 9973-6.
A.H. Hoveyda et al., JACS, 122 (34), 8168-79.
Y. Na, S. Chang, Org. Lett., 2000, 2, 1887.
B.M. Trost et al., JACS, 2001, 123, 12726.
B.M. Trost et al., JACS, 2005, 127, 17644.
B.M. Trost et al., JACS 2002, 124, 7922.
B.M. Trost et al., Org. Lett., 2003, 5, 1895.
B.M. Trost et al., JACS, 2004, 126, 13942.
F. Agbossou et al., "The aminophosphine-phosphinites and related ligands: synthesis, coordination chemistry and enantioselective catalysis", Coordin. Chem. Reviews, (1998), 178-180, 1615-45.
R. Adams el al., "Catalytic Hydrosilylation of Diarylalkynes by Layer-Segregated Platinum-Ruthenium Cluster Complexes Pt3Ru6(CO)20(μ3-RC2R)(μ3-H)(μ-H)", Organomet., (1998), 17(12), 2567-73.
J. Berding et al., Eur. J. Inorg. Chem., (2011), 2450 and references therein.
J. Alfaro et al., Org. Lett., (2004), 6, 3045.
S.E. Denmark et al., Org. Lett., (2000), 2, 565.
S.E. Denmark et al., Org. Lett., (2001), 3, 1073.
S.E. Denmark et al., Org. Synth., (2005), 81, 54.
A. Hayashi et al., "Synthesis and reactions of diphosphinidenecyclobutene ruthenium complexes relevant to catalytic hydrosilylation of terminal alkynes", Organomet., (2008), 27(10), 2321-2327.
L. Deng et al., "Regio- and stereoselective hydrosilylation of alkynes catalyzed by three-coordinate Cobalt(I) alkyl and silyl complexes", JACS, (2014), being published.
Y. Nakao et al., "Synthesis and cross-coupling reaction of alkenyl[(2-hydroxymethyl)phenyl]dimethylsilanes", J. Organomet. Chem., (2007), 692(1-3), 585-603.
D.A. Rooke, E.M. Ferreira, "Stereoselective syntheses of trisubstituted olefins via platinum catalysis: a-silylenones with geometrical complementarity", JACS, (2010), 132(34), 11926-11928.
D.A. Rooke et al., "An analysis of the influences dictating regioselectivity in platinum-catalyzed hydrosilylations of internal alkynes", Tetrahedron, (2014), 70 (27-28), 4232-44.
D. Troegel, J. Stohrer; Coordination Chem. Reviews 255 (2001) reported in B. Marciniec et al.; Advances in Silicon Science 2009.
Fagan, P. J.; Ward, M. D.; Clalbrese, J. C. J. Am. Chem. Soc. 1989, 111, 1698.
Tilley, T. D.; Grubbs, R. H.; Bercaw, J. E. Organometallics 1984, 3, 274.
Liu, J.; Zhang, L.; Lam, J. W. Y.; Jim, C. K. W.; Yue, Y.; Deng, R.; Hong, Y.; Qin, A.; Sung, H. H. Y.; Williams, I. D.; Jia, G.; Tang, B. Z. Macromolecules 2009, 42, 7367.
Steinmetz, B.; Schenk, W. A. Organometallics 1999, 18, 943.
Mbaye, M. D.; Demerseman, B.; Renaud, J.-L.; Bruneau, C. J. Organomet. Chem. 2005, 690, 2149.

\* cited by examiner bracket these values. Hydrocarbyl groups may also be exemplified by methyl, ethyl...

CURABLE COMPOSITION AND COATED SUBSTRATE

CROSS-REFERENCE TO RELATED APPLICATIONS

This application is the National Stage of International Application No. PCT/US2018/017565 filed on 9 Feb. 2018, which claims priority to and all advantages of European Patent Application No. 17305156.6 filed on 10 Feb. 2017, the contents of which are hereby incorporated by reference.

FIELD OF THE INVENTION

The present invention generally relates to a curable composition and, more specifically, to a curable composition having excellent shelf-life and stability and to a process of preparing a coated substrate therewith.

DESCRIPTION OF THE RELATED ART

Curable compositions are known in the art and utilized in diverse end use applications. Generally, curable compositions include one or more components, which react or polymerize in the presence of a curing condition, e.g. heat or elevated temperature. Silicone compositions may be formulated as curable compositions. For example, silicone compositions, which cure in the presence of a platinum catalyst, are known (and are known as addition-curable compositions or hydrosilylation-curable compositions). Curing these silicone compositions typically results in an article, which may be in the form of a film or coating, e.g. on a substrate.

To prevent premature reaction and improve shelf life in such silicone compositions, reaction inhibitors are commonly utilized therein, which reaction inhibitors substantially prevent curing of the silicone compositions at ambient temperature. Typically, elevated temperatures in excess of 150° C. are utilized and/or required to deactivate or decompose such reaction inhibitors, thereby allowing and catalyzing curing of the silicone compositions. However, many end use applications involve more sensitive substrates and components for which these elevated temperatures are undesirable. For example, various performance plastics, such a polypropylene, are often utilized as substrates for films or coatings. However, these performance plastics may have a melting or softening point temperature that is less than the elevated temperature required for curing the silicone compositions, which is undesirable and can lead to deformation of the performance plastics.

SUMMARY OF THE INVENTION

The present invention provides a curable composition. The curable composition comprises: (A) an organopolysiloxane containing at least two silicon-bonded aliphatically unsaturated groups per molecule; (B) an organohydrogensiloxane containing at least two silicon-bonded hydrogen atoms per molecule; (C) a hydrosilylation-reaction catalyst; (D) a hydrosilylation-reaction inhibitor; and (E) a catalyst different from component (C) and capable of deactivating the (D) hydrosilylation-reaction inhibitor at an elevated temperature of from 50 to 120° C. such that components (A) and (B) react in the presence of at least component (C) at the elevated temperature.

The present invention also provides a process of preparing a coated substrate with the curable composition. The process comprises disposing the curable composition on the substrate. The method further comprises curing the curable composition on the substrate at an elevated temperature of from 50 to 120° C. to give the coated substrate.

DETAILED DESCRIPTION OF THE INVENTION

The present invention provides a curable composition. The curable composition has excellent physical properties, including shelf life and stability. Moreover, the curable composition is curable at lower temperatures than conventional curable compositions, and thus the curable composition may be utilized in broad end use applications and environments, including on diverse substrates such as performance plastics. However, the curable composition is not limited to any particular end use application.

The curable composition comprises (A) an organopolysiloxane containing at least two silicon-bonded aliphatically unsaturated groups per molecule. The (A) organopolysiloxane is not limited and may be any organopolysiloxane including at least two silicon-bonded aliphatically unsaturated groups per molecule. For example, the (A) organopolysiloxane may be linear, branched, partly branched, cyclic, resinous (i.e., have a three-dimensional network), or may comprise a combination of different structures.

In certain embodiments, the (A) organopolysiloxane has the following average formula:

$$R_aSiO_{(4-a)/2}$$

wherein each R is an independently selected substituted or unsubstituted hydrocarbyl group with the proviso that in each molecule, at least two of R include ethylenic unsaturation, and wherein a is selected such that 0<a≤3.2. The average formula above for the (A) organopolysiloxane may be alternatively written as $(R_3SiO_{1/2})_w(R_2SiO_{2/2})_x(RSiO_{3/2})_y(SiO_{4/2})_z$, where R is defined above, and w, x, y, and z are independently from ≥0 to ≤1, with the proviso that w+x+y+z=1. One of skill in the art understands how such M, D, T, and Q units and their molar fractions influence subscript a in the average formula above. T and Q units, indicated by subscripts y and z, are typically present in silicone resins, whereas D units, indicated by subscript x, are typically present in silicone polymers (and may also be present in silicone resins).

Each R is independently selected, as introduced above, and may be linear, branched, cyclic, or combinations thereof. Cyclic hydrocarbyl groups encompass aryl groups as well as saturated or non-conjugated cyclic groups. Aryl groups may be monocyclic or polycyclic. Linear and branched hydrocarbyl groups may independently be saturated or unsaturated. One example of a combination of a linear and cyclic hydrocarbyl group is an aralkyl group.

Substituted hydrocarbyl groups are hydrocarbyls having one or more hydrogen atoms replaced (i.e., substituted) with another atom or substituent (i.e., group), for example, a halogen atom such as chlorine, fluorine, bromine or iodine, an oxygen atom containing group such as an acrylic, methacrylic, alkoxy, or carboxyl group, a nitrogen atom containing group such as an amino, amido, or cyano group, or a sulphur atom containing group such as a mercapto group. Examples of substituted hydrocarbyl groups include propyl groups substituted with chlorine or fluorine, such as 3,3,3-trifluoropropyl, chlorophenyl, beta-(perfluorobutyl)ethyl, and chlorocyclohexyl groups.

Hydrocarbyl groups may be exemplified by methyl, ethyl, propyl, isopropyl, butyl, isobutyl, t-butyl, pentyl, hexyl, cyclohexyl, heptyl, octyl, nonyl, decyl, or similar alkyl groups; vinyl, allyl, propenyl, isopropenyl, butenyl, isobutenyl, pentenyl, heptenyl, hexenyl, cyclohexenyl, or similar alkenyl groups; phenyl, tolyl, xylyl, naphthyl, or similar aryl groups; benzyl, phenethyl, or similar aralkyl groups; and 3-chloropropyl, 2-bromoethyl, 3,3,3-trifluoropropyl, or similarly substituted (e.g. halogenated) alkyl groups.

In each molecule of the (A) organopolysiloxane, at least two of R include ethylenic unsaturation. The ethylenic unsaturation is generally terminal in R. Typically, the R including ethylenic unsaturation is independently selected from an alkenyl group and an alkynyl group. "Alkenyl" means an acyclic, branched or unbranched, monovalent hydrocarbon group having one or more carbon-carbon double bonds. Alkenyl is exemplified by, but not limited to, vinyl, allyl, propenyl, and hexenyl. The alkenyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. Specific examples thereof include vinyl groups, allyl groups, and hexenyl groups. "Alkynyl" means an acyclic, branched or unbranched, monovalent hydrocarbon group having one or more carbon-carbon triple bonds. Alkynyl is exemplified by, but not limited to, ethynyl, propynyl, and butynyl. The alkynyl group may have from 2 to 30 carbon atoms, alternatively from 2 to 24 carbon atoms, alternatively from 2 to 20 carbon atoms, alternatively from 2 to 12 carbon atoms, alternatively from 2 to 10 carbon atoms, alternatively from 2 to 6 carbon atoms. In specific embodiments, the (A) organopolysiloxane includes at least two silicon-bonded alkenyl groups per molecule, but is free from silicon-bonded alkynyl groups.

In certain embodiments, the (A) organopolysiloxane is substantially linear, alternatively is linear. In these embodiments, the substantially linear organopolysiloxane may have the average formula:

$$R_{a'}SiO_{(4-a')/2}$$

wherein each R and its provisos are defined above, and wherein a' is selected such that $1.9 \leq a' \leq 2.2$.

In these embodiments, at a temperature of 25° C., the substantially linear organopolysiloxane is typically a flowable liquid or is in the form of an uncured rubber. Generally, the substantially linear organopolysiloxane has a viscosity of from 10 to 30,000,000 mPa·s, alternatively from 10 to 10,000 mPa·s, alternatively from 100 to 1,000,000 mPa·s, alternatively from 100 to 100,000 mPa·s at 25° C. Viscosity may be measured at 25° C. via a Brookfield LV DV-E viscometer, as understood in the art.

In specific embodiments in which the (A) organopolysiloxane is substantially linear or linear, the (A) organopolysiloxane may have the average formula:

$$(R_3SiO_{1/2})_m(R_2SiO_{2/2})_n(RSiO_{2/2})_o,$$

wherein each R is independently selected and defined above, and $m \geq 2$, $n \geq 0$, and $o \geq 2$. In specific embodiments, m is from 2 to 10, alternatively from 2 to 8, alternatively from 2 to 6. In these or other embodiments, n is from 0 to 1,000, alternatively from 1 to 500, alternatively from 1 to 200. In these or other embodiments, o is from 2 to 500, alternatively from 2 to 200, alternatively from 2 to 100.

When the (A) organopolysiloxane is substantially linear, alternatively is linear, the at least two silicon-bonded aliphatically unsaturated groups may be pendent, terminal or in both pendent and terminal locations. As a specific example of the (A) organopolysiloxane having pendant silicon-bonded aliphatically unsaturated groups, the (A) organopolysiloxane may have the average formula:

$$(CH_3)_3SiO[(CH_3)_2SiO]_n[(CH_3)ViSiO]_mSi(CH_3)_3$$

where n and m are defined above, and Vi indicates a vinyl group. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two ethylenically unsaturated groups are present per molecule. Alternatively, as a specific example of the (A) organopolysiloxane having terminal silicon-bonded aliphatically unsaturated groups, the (A) organopolysiloxane may have the average formula:

$$Vi(CH_3)_2SiO[(CH_3)_2SiO]_nSi(CH_3)_2Vi$$

where n and Vi are defined above. The dimethyl polysiloxane terminated with silicon-bonded vinyl groups may be utilized alone or in combination with the dimethyl, methylvinyl polysiloxane disclosed immediately above. With regard to this average formula, one of skill in the art knows that any methyl group may be replaced with a vinyl or a substituted or unsubstituted hydrocarbyl group, and any vinyl group may be replaced with any ethylenically unsaturated group, so long as at least two aliphatically unsaturated groups are present per molecule. Because the at least two silicon-bonded aliphatically unsaturated groups may be both pendent and terminal, the (A) organopolysiloxane may have the average formula:

$$Vi(CH_3)_2SiO[(CH_3)_2SiO]_n[(CH_3)ViSiO]_mSiVi(CH_3)_2$$

where n, m and Vi are defined above.

The substantially linear organopolysiloxane can be exemplified by a dimethylpolysiloxane capped at both molecular terminals with dimethylvinylsiloxy groups, a methylphenylpolysiloxane capped at both molecular terminals with dimethylvinylsiloxy groups, a copolymer of a methylphenylsiloxane and dimethylsiloxane capped at both molecular terminals with dimethylvinylsiloxy groups, a copolymer of a methylvinylsiloxane and a methylphenylsiloxane capped at both molecular terminals with dimethylvinylsiloxy groups, a copolymer of a methylvinylsiloxane and diphenylsiloxane capped at both molecular terminals with dimethylvinylsiloxy groups, a copolymer of a methylvinylsiloxane, methylphenylsiloxane, and dimethylsiloxane capped at both molecular terminals with dimethylvinylsiloxy groups, a copolymer of a methylvinylsiloxane and a methylphenylsiloxane capped at both molecular terminals with trimethylsiloxy groups, a copolymer of a methylvinylsiloxane and diphenylsiloxane capped at both molecular terminals with trimethylsiloxy groups, and a copolymer of a methylvinylsiloxane, methylphenylsiloxane, and a dimethylsiloxane capped at both molecular terminals with trimethylsiloxy groups.

In these or other embodiments, the (A) organopolysiloxane may be a resinous organopolysiloxane. In these embodiments, the resinous organopolysiloxane may have the average formula:

$$R_{a''}SiO_{(4-a'')/2}$$

wherein each R and its provisos are defined above, and wherein a'' is selected such that $0.5 \leq a'' \leq 1.7$.

The resinous organopolysiloxane has a branched or a three dimensional network molecular structure. At 25° C., the resinous organopolysiloxane may be in a liquid or in a solid form.

In specific embodiments, the resinous organopolysiloxane may be exemplified by an organopolysiloxane that comprises only T units, an organopolysiloxane that comprises T units in combination with other siloxy units (e.g. M, D, and/or Q siloxy units), or an organopolysiloxane comprising Q units in combination with other siloxy units (i.e., M, D, and/or T siloxy units). Typically, the resinous organopolysiloxane comprises T and/or Q units. A specific example of the resinous organopolysiloxane is a vinyl-terminated silsesquioxane.

The (A) organopolysiloxane may comprise a combination or mixture of different organopolysiloxanes, including those of different structures.

The curable composition further comprises (B) an organohydrogensiloxane containing at least two silicon-bonded hydrogen atoms per molecule.

The (B) organohydrogensiloxane may be any organosiloxane, e.g. an organopolysiloxane, containing an average of at least two silicon-bonded hydrogen atoms (SiH) per molecule. The silicon-bonded hydrogen atoms may be terminal, pendent, or in both terminal and pendent locations in the (B) organohydrogensiloxane.

The (B) organohydrogensiloxane may comprise any combination of M, D, T and/or Q siloxy units, so long as the (B) organohydrogensiloxane includes at least two silicon-bonded hydrogen atoms. These siloxy units can be combined in various manners to form cyclic, linear, branched and/or resinous (three-dimensional networked) structures. The (B) organohydrogensiloxane may be monomeric, polymeric, oligomeric, linear, branched, cyclic, and/or resinous depending on the selection of M, D, T, and/or Q units.

Because the (B) organohydrogensiloxane includes an average of at least two silicon-bonded hydrogen atoms per molecule, with reference to the siloxy units set forth above, the (B) organohydrogenpolysiloxane may comprise any of the following siloxy units including silicon-bonded hydrogen atoms, optionally in combination with siloxy units which do not include any silicon-bonded hydrogen atoms: $(R_2HSiO_{1/2})$, $(RH_2SiO_{1/2})$, $(H_3SiO_{1/2})$, $(RHSiO_{2/2})$, $(H_2SiO_{2/2})$, and/or $(HSiO_{3/2})$.

In specific embodiments, the (B) organohydrogensiloxane has the average formula:

wherein each $R^1$ is independently hydrogen or $R^2$, each $R^2$ is independently a substituted or unsubstituted hydrocarbyl group, and e≥2, f≥0, and g≥2. In specific embodiments, e is from 2 to 10, alternatively from 2 to 8, alternatively from 2 to 6. In these or other embodiments, f is from 0 to 1,000, alternatively from 1 to 500, alternatively from 1 to 200. In these or other embodiments, g is from 2 to 500, alternatively from 2 to 200, alternatively from 2 to 100.

The hydrocarbyl group(s) represented by $R^2$ may be substituted or unsubstituted, and may be aliphatic, aromatic, cyclic, alicyclic, etc. Moreover, the hydrocarbyl group(s) represented by $R^2$ may include one or more heteroatoms replacing carbon atoms, e.g. N, S, or O may replace C in the hydrocarbyl group(s) represented by $R^2$. The term "substituted" as used in relation to a hydrocarbyl group means, unless indicated otherwise, one or more hydrogen atoms in the hydrocarbyl group has been replaced with another substituent. Examples of such substituents include, for example, halogen atoms; halogen atom containing groups; oxygen atoms; oxygen atom containing groups; nitrogen atoms; nitrogen atom containing groups; sulphur atoms; and sulphur atom containing groups.

Unsubstituted aliphatic hydrocarbyl groups are exemplified by, but not limited to, alkyl groups such as methyl, ethyl, propyl, pentyl, octyl, undecyl, and octadecyl groups, and cycloalkyl groups such as cyclohexyl groups. Substituted aliphatic hydrocarbyl groups are exemplified by, but not limited to halogenated alkyl groups such as chloromethyl, 3-chloropropyl, and 3,3,3-trifluoropropyl groups. Aromatic hydrocarbon groups are exemplified by, but not limited to, phenyl, tolyl, benzyl, styryl, and 2-phenylethyl groups. Substituted hydrocarbyl groups have one or more hydrogen atoms replaced with another atom or substituent, for example, a halogen atom such as chlorine, fluorine, bromine, or iodine, an oxygen atom containing group such as an acrylic, methacrylic, alkoxy, or carboxyl group, a nitrogen atom containing group such as an amino, amido, or cyano group, or a sulphur atom containing group such as a mercapto group. Examples of substituted hydrocarbon groups include propyl groups substituted with chlorine or fluorine, such as 3,3,3-trifluoropropyl, chlorophenyl, beta-(perfluorobutyl)ethyl, and chlorocyclohexyl group. In some embodiments, at least some or all of the $R^2$ groups are methyl groups.

In certain embodiments, the (B) organohydrogensiloxane may have one of the following average formulas:

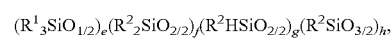

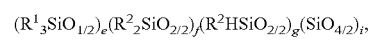

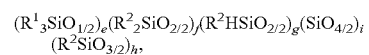

wherein each $R^1$ and $R^2$ is independently selected and defined above, e, f, and g are defined above, and h≥0, and i is ≥0. In each of the average formulas above, the sum of the subscripts is 1.

In one embodiment, the (B) organohydrogensiloxane is linear and includes pendent silicon-bonded hydrogen atoms. In these embodiments, the (B) organohydrogensiloxane may be a dimethyl, methyl-hydrogen polysiloxane having the average formula;

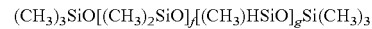

where f and g are defined above.

In these or other embodiments, the (B) organohydrogensiloxane is linear and includes terminal silicon-bonded hydrogen atoms. In these embodiments, the (B) organohydrogensiloxane may be an SiH terminal dimethyl polysiloxane having the average formula:

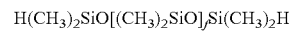

where f is as defined above. The SiH terminal dimethyl polysiloxane may be utilized alone or in combination with the dimethyl, methyl-hydrogen polysiloxane disclosed immediately above. When a mixture is utilized, the relative amount of each organohydrogensiloxane in the mixture may vary.

Alternatively still, the (B) organohydrogensiloxane may include both pendent and terminal silicon-bonded hydrogen atoms.

In certain embodiments, the (B) organohydrogensiloxane may comprise an alkylhydrogen cyclosiloxane or an alkylhydrogen dialkyl cyclosiloxane copolymer, represented in general by the formula $(R^1{}_2SiO)_{y'}(R^2HSiO)_{z'}$, where $R^1$ and $R^2$ are as defined above, and where y' is an integer from 0-7 and z' is an integer from 3-10. Specific examples of suitable organohydrogensiloxanes of this type include $(OSiMeH)_4$, (OSiMeH)$_3$(OSiMeC$_6$H$_{13}$), (OSiMeH)$_2$(OSiMeC$_6$H$_{13}$)$_2$, and (OSiMeH)(OSiMeC$_6$H$_{13}$)$_3$, where Me represents methyl (—CH$_3$).

Other examples of suitable organohydrogensiloxanes are those having at least two SiH containing cyclosiloxane rings in one molecule. Such an organohydrogensiloxane may be any organopolysiloxane having at least two cyclosiloxane rings with at least one silicon-bonded hydrogen (SiH) atom on each siloxane ring. Cyclosiloxane rings contain at least three siloxy units (that is the minimum needed in order to form a siloxane ring), and may be any combination of M, D, T, and/or Q siloxy units that forms a cyclic structure, provided that at least one of the cyclic siloxy units on each siloxane ring contains one SiH unit, which may be an M siloxy unit, a D siloxy unit, and/or a T siloxy unit. These siloxy units can be represented as MH, DH, and TH siloxy units respectively when other substituents are methyl.

The (B) organohydrogensiloxane may comprise a combination or two or more different organohydrogensiloxanes in concert.

The curable composition may comprise the (A) organopolysiloxane and the (B) organohydrogensiloxane in varying amounts or ratios contingent on desired properties or end use application of the curable composition. In various embodiments, the curable composition comprises components (A) and (B) in an amount to provide a mole ratio of silicon-bonded hydrogen atoms in component (B) to ethylenically unsaturated groups in component (A) of from 0.3 to 5, alternatively from 0.6 to 3.

The curable composition further comprises (C) a hydrosilylation-reaction catalyst. The (C) hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the (C) hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the (C) hydrosilylation-reaction catalyst.

Additional examples of catalysts suitable for the (C) hydrosilylation-reaction catalyst include rhenium (Re), molybdenum (Mo), Group IV transition metals (i.e., titanium (ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the (C) hydrosilylation-reaction catalyst.

The (C) hydrosilylation-reaction catalyst may be in any suitable form. For example, the (C) hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The (C) hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The (C) hydrosilylation-reaction catalyst may also be disposed in a vehicle, e.g. a solvent which solubilizes the (C) hydrosilylation-reaction catalyst, alternatively a vehicle which merely carries, but does not solubilize, the (C) hydrosilylation-reaction catalyst. Such vehicles are known in the art.

In specific embodiments, the (C) hydrosilylation-reaction catalyst comprises platinum. In these embodiments, the (C) hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the (C) hydrosilylation-reaction catalyst include 1,3-diethenyl-1,1,3,3-tetramethyldisiloxane complexes with platinum. These complexes may be microencapsulated in a resin matrix. Alternatively, the (C) hydrosilylation-reaction catalyst may comprise 1,3-diethenyl-1,1,3,3-tetramethyldisiloxane complex with platinum. The (C) hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$.

Additional examples of suitable hydrosilylation catalysts for component (C) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The (C) hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

Specific examples of photoactivatable hydrosilylation catalysts suitable for the (C) hydrosilylation-reaction catalyst include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum (III) bis(1,1,1,5,5,5-hexafluoro-2,4-pentanedioate); (r-cyclopentadienyl)trialkylplatinum complexes, such as (Cp)trimethylplatinum, (Cp)ethyldimethylplatinum, (Cp) triethylplatinum, (chloro-Cp)trimethylplatinum, and (trimethylsilyl-Cp)trimethylplatinum, where Cp represents cyclopentadienyl; triazene oxide-transition metal complexes, such as Pt[C₆H₅NNNOCH₃]₄, Pt[p-CN—C₆H₄NNNOC₆H₁₁]₄, Pt[p-H₃COC₆H₄NNNOC₆H₁₁]₄, Pt[p-CH₃(CH₂)ₓ—C₆H₄NNNOCH₃]₄, 1,5-cyclooctadiene.Pt[p-CN—C₆H₄NNNOC₆H₁₁]₂, 1,5-cyclooctadiene.Pt[p-CH₃O—C₆H₄NNNOCH₃]₂, [(C₆H₅)₃P]₃Rh[p-CN—C₆H₄NNNOC₆H₁₁], and Pd[p-CH₃(CH₂)ₓ—C₆H₄NNNOCH₃]₂, where x is 1, 3, 5, 11, or 17; (η-diolefin)(σ-aryl)platinum complexes, such as (η⁴-1,5-cyclooctadienyl)diphenylplatinum, η⁴-1,3,5,7-cyclooctatetraenyl)diphenylplatinum, (η⁴-2,5-norboradienyl)diphenylplatinum, (η⁴-1,5-cyclooctadienyl)bis-(4-dimethylaminophenyl)platinum, (η⁴-1,5-cyclooctadienyl)bis-(4-acetylphenyl)platinum, and (η⁴-1,5-cyclooctadienyl)bis-(4-trifluormethylphenyl)platinum. Typically, the photoactivatable hydrosilylation catalyst is a Pt(II) β-diketonate complex and more typically the catalyst is platinum(II) bis(2,4-pentanedioate). The hydrosilylation catalyst can be a single photoactivatable hydrosilylation catalyst or a mixture comprising two or more different photoactivatable hydrosilylation catalysts.

The (C) hydrosilylation-reaction catalyst is present in the curable composition in a catalytic amount, i.e., an amount or quantity sufficient to promote curing thereof at desired conditions. The catalytic amount of the (C) hydrosilylation-reaction catalyst may be greater than 0.01 ppm, and may be greater than 1,000 ppm (e.g., up to 10,000 ppm or more). In certain embodiments, the typical catalytic amount of (C) hydrosilylation-reaction catalyst is less than 5,000 ppm, alternatively less than 2,000 ppm, alternatively less than 1,000 ppm (but in any case greater than 0 ppm). In specific embodiments, the catalytic amount of the (C) hydrosilylation-reaction catalyst may range from 0.01 to 1,000 ppm, alternatively 0.01 to 100 ppm, and alternatively 0.01 to 50 ppm of platinum group metal based on the weight of the curable composition.

The curable composition further comprises (D) a hydrosilylation-reaction inhibitor. The (D) hydrosilylation-reaction inhibitor serves to improve shelf life and stability of the curable composition at ambient conditions and generally prevents premature reaction between the (A) organopolysiloxane and the (B) organohydrogensiloxane in the presence of the (C) hydrosilylation-reaction catalyst.

The (D) hydrosilylation-reaction inhibitor may be exemplified by alkyne alcohols (or acetylenic alcohols), cycloalkenylsiloxanes, ketones, ene-yne compounds, triazoles, phosphines, mercaptans, hydrazines, sulphoxides, phosphates, nitriles, hydroperoxides, amines, ethylenically unsaturated isocyanates, fumarates (e.g. dialkyl fumarates, dialkenyl fumarates, dialkoxyalkyl fumarates), maleates (e.g. diallyl maleates), alkenes, and combinations thereof.

Suitable cycloalkenylsiloxanes include methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; suitable ene-yne compounds include 3-methyl-3-penten-1-yne, 3,5-dimethyl-3-hexen-1-yne; suitable triazoles includes benzotriazole; phosphines; mercaptans; hydrazines; suitable amines includes tetramethyl ethylenediamine. Examples of acetylenic alcohol inhibitors include 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol. Alternatively, the (D) hydrosilylation-reaction inhibitor in the curable composition may be a silylated acetylenic inhibitor.

In certain embodiments, the (D) hydrosilylation-reaction inhibitor comprises: (i) an alkene group; (ii) an alkyne group; (iii) an unsaturated ester, alternatively a maleate group; or (iv) any combination of (i) to (iii).

In specific embodiments, the (D) hydrosilylation-reaction inhibitor comprises an alkyne group. The (D) hydrosilylation-reaction inhibitor may include one or more alkyne groups, as well as other functionalities, and may be an organic compound and/or an organosilicon compound.

One specific example of a suitable compound for use as the (D) hydrosilylation-reaction inhibitor is a dicarboxyacetylene ester. Dicarboxyacetylene esters have the following structure:

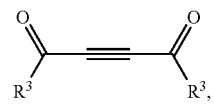

where each $R^3$ is an independently selected alkyl group having, for example, from 1 to 22, alternatively from 1 to 10, alternatively from 1 to 6, alternatively from 1 to 4, carbon atoms. The alkyl groups represented by $R^3$ may optionally and independently be substituted.

Other specific examples of suitable compounds as the (D) hydrosilylation-reaction inhibitor include alcohols or diols. Such compounds may be broadly referred to as alkyne alcohols, and include at least one alkyne group and at least one alcohol group. The alkyne alcohol may be a monohydric alcohol, a diol, a triol, etc. Alkyne alcohols may alternatively be referred to as acetylenic alcohols. Alkyne monohydric alcohols may have the following structure:

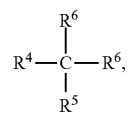

where $R^4$ comprises an alkynyl group, $R^5$ comprises an alcohol group, and each $R^6$ is an independently selected substituted or unsubstituted hydrocarbyl group. Suitable hydrocarbyl groups are defined above and may be branched, cyclic, linear, aryl, etc. Exemplary species of such alkyne monohydric alcohols include:

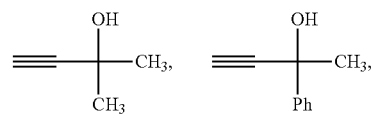

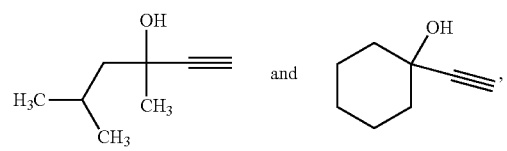

where Ph designates a phenyl group. Specific examples of suitable alkyne diols include the following:

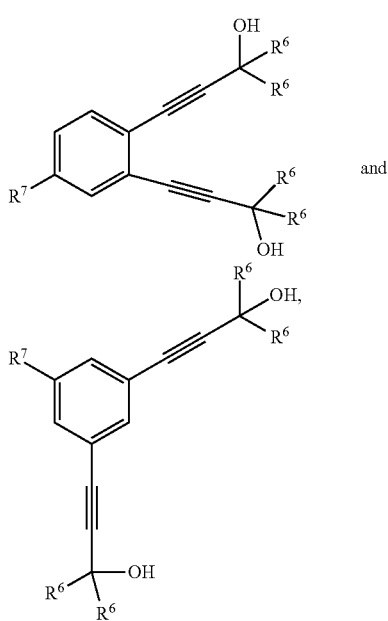

where each $R^6$ is defined above and is independently selected, and each $R^7$ is independently selected from H and $NO_2$. One of skill in the art understands that these specific examples are illustrative only and do not limit the scope of alkyne diols suitable for use as the (D) hydrosilylation-reaction inhibitor. Further examples of suitable alkyne compounds include, for illustrative purposes only, the following alkynes:

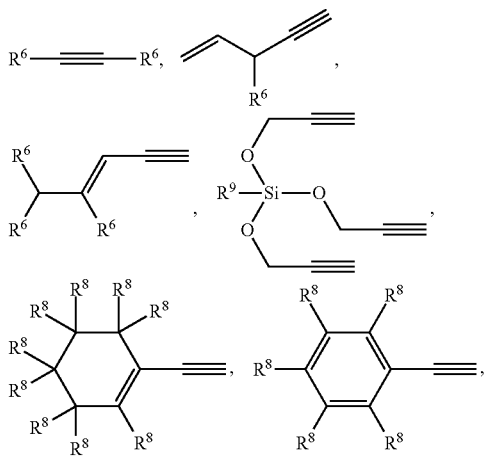

wherein each $R^6$ is independently selected and defined above, each $R^8$ is independently selected from H and a substituted or unsubstituted hydrocarbyl group, and each $R^9$ is an independently selected substituted or unsubstituted hydrocarbyl group. Specific examples of substituted and unsubstituted hydrocarbyl groups are defined above.

Silylated acetylenic inhibitors are exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the (D) hydrosilylation-reaction inhibitor is exemplified by methyl(tris(1,1-dimethyl-2-propynyloxy))silane, ((1,1-dimethyl-2-propynyl)oxy)trimethylsilane, or a combination thereof. Specific examples of suitable species for the (D) hydrosilylation-reaction inhibitor include, but are not limited to, trans-stilbene, cis-stilbene, diphenylacetylene, 3,3-dimethyl-1-butyne, bicyclo[2.2.1] hept-2-ene, bicyclo[2.2.1] hepta-2,5-diene, cyclohexylacetylene, 1-ethynylcyclohexene, benzyl alcohol, acetylacetone, 2,4,7,9-tetramethyl-5-decyne-4,7-diol, 2-butyn-1-ol, 4-pentyn-1-ol, 2-butyne-1,4-diol, methyl propargyl ether, 3-butyn-1-ol, propargyl alcohol, 3-butyn-2-ol, 3-methyl-1-penten-4-yn-3-ol, 3,3-diethoxy-1-propyne, 2-methyl-3-butyn-2-ol, 3,5-dimethyl-1-hexyn-3-ol, 1-ethynylcyclopentanol, 1-ethynyl-1-cyclohexanol, 1-phenyl-2-propyn-1-ol, 2-phenyl-3-butyn-2-ol, 1,1-diphenyl-2-propyn-1-ol, tetraethyl ethylenetetracarboxylate, ethyl cinnamate, ethyl sorbate, 1,4-naphthoquinone, maleic anhydride, diethyl fumarate, diethyl maleate, diallyl fumarate, diallyl maleate, 2-butyne-1,4-diol diacetate, methyl propiolate, ethyl propiolate, ethyl phenylpropiolate, dimethyl acetylenedicarboxylate, diethyl acetylenedicarboxylate, di-tert-butyl acetylenedicarboxylate, 2,4,6,8-tetramethyl-2,4,6,8-tetravinylcyclotetrasiloxane, tetracyanoethylene, 1,3,5-triallyl-1,3,5-triazine-2,4,6(1H,3H,5H)-trione, 3-dimethylamino-1-propyne, n-methylpropargylamine, propargylamine, and 1-ethynylcyclohexylamine.

Combinations of different compounds may be utilized together or in combination as the (D) hydrosilylation-reaction inhibitor. The (D) hydrosilylation-reaction inhibitor is typically present in the curable composition in an amount sufficient to prevent the reaction of the (A) organopolysiloxane and the (B) organohydrogensiloxane at ambient conditions. At least some reaction between the (A) organopolysiloxane and the (B) organohydrogensiloxane may occur despite the presence of the (D) hydrosilylation-reaction inhibitor, but the curable composition remains curable. The curable composition may additionally be a one component (1 k) or two component (2 k) system, whereby components (A), (B) and (C) are not combined with one another until an end use application of the curable composition. In certain embodiments, the curable composition comprises the (D) hydrosilylation-reaction inhibitor in an amount of from greater than 0 to 15, alternatively from 0.01 to 10, weight percent based on the total weight of the curable composition. In these or other embodiments, the curable composition comprises the (D) hydrosilylation-reaction inhibitor in a molar ratio of at least 20:1, alternatively at least 25:1, alternatively at least 30:1, of the (D) hydrosilylation-reaction inhibitor relative to the (C) hydrosilylation-reaction catalyst.

The curable composition further comprises (E) a catalyst different from component (C) and capable of deactivating the (D) hydrosilylation-reaction inhibitor at an elevated temperature of from 50 to 120° C. such that components (A) and (B) react in the presence of at least component (C) at the elevated temperature.

The (E) catalyst is not limited and may be any catalyst suitable for deactivating the (D) hydrosilylation-reaction inhibitor at an elevated temperature of from 50 to 120° C. The (E) catalyst is generally contingent on the selection of the (D) hydrosilylation-reaction inhibitor. The (E) catalyst is typically chemoselective and deactivates the (D) hydrosilylation-reaction inhibitor without catalyzing the hydrosilylation-reaction between components (A) and (B). By deactivating the (D) hydrosilylation-reaction inhibitor, the (E) catalyst may decompose and/or react with the (D) hydrosilylation-reaction inhibitor. Upon deactivation of the (D) hydrosilylation-reaction inhibitor, the (A) organopolysiloxane and the (B) organohydrogensiloxane may react in the presence of at least the (C) hydrosilylation-reaction catalyst, along with any other compounds or byproducts associated with the deactivation of the (D) hydrosilylation-reaction inhibitor by the (E) catalyst, including residual amounts of the (D) hydrosilylation-reaction inhibitor and/or the (E) catalyst. Moreover, the (E) catalyst deactivates the (D) hydrosilylation-reaction inhibitor at the elevated temperature such that at ambient conditions or room temperature there is generally no reaction or deactivation of the (D) hydrosilylation-reaction inhibitor, thereby improving shelf life and stability of the curable composition.

In certain embodiments, the (E) catalyst comprises at least one of Rh, Pt, Fe, Co, Ni, Ti, Y, Pd, Au and Ru, alternatively comprises Ru and/or Rh, alternatively comprises Ru. As described below, other examples of the (E) catalyst include lanthanides, e.g. those comprising lutetium (Lu), actinides, e.g. those comprising uranium (U) and/or thorium (Th), and Lewis acids. The description above for the (C) hydrosilylation-reaction catalyst may also apply to the (E) catalyst, although the (C) hydrosilylation-reaction catalyst and the (E) catalyst are different from one another and are selected to have different catalytic activity. For example, the (C) hydrosilylation-reaction catalyst generally doesn't deactivate the (D) hydrosilylation-reaction inhibitor unless at specifically high temperatures, whereas the (E) catalyst does.

When the (E) catalyst comprises Ru, the Ru typically has an oxidation state of from −2 to +6, alternatively from −2 to +2. The (E) catalyst may comprise Ru having different oxidation states, and/or Ru in combination with other elements having different oxidation states.

In specific embodiments, the (E) catalyst comprises a metal-ligand complex, e.g. an Ru metal-ligand complex, which may be generally referred to as an organometallic complex. The metal-ligand complex generally comprises a metal, e.g. at least one of Rh, Pt, Fe, Co, Ni, Ti, Y, Pd, Au and Ru, metal ligand(s), and optionally a counter-anion depending on ionicity of the metal ligands. One of skill in the art understands ligands and counter-anions suitable for such metal-ligand complexes are based on a selection of the metal and its oxidation state, and that combinations of ligands and/or counter anions may be used. The ligands may be neutral or may be ionic (e.g. anionic), and may have one or more binding sites to the metal (i.e., may be monodentate, bidentate, or multidentate ligands).

In certain embodiments, the metal-ligand complex comprises, alternatively has general formula $[YML_1L_2L_3]^+[X]^-$, where Y is a substituted or unsubstituted cyclopentadienyl group of formula $C_5R^{10}R^{11}R^{12}R^{13}R^{14}$, where each of $R^{10}$-$R^{14}$ is independently selected from H, substituted or unsubstituted hydrocarbyl groups, silyl groups, siloxy groups, and alkoxy groups; M is a metal selected from Rh, Pt, Fe, Co, Ni, Ti, Y, Pd, Au and Ru; each of $L_1$-$L_3$ is an independently selected ligand; and X is an anion.

Alternatively still, the metal-ligand complex may comprise two or more moieties associated with general formula general formula $[YML_1L_2L_3]^+[X]^-$. For example, at least one ligand may complex with and bridge each metal atom in such a metal-ligand complex. Such a metal ligand complex may be represented by general formula $[YML_3L_2L_1L_1L_2L_3MY]^+$, where two $L_1$ ligands form the bridge, two $L_2$ ligands form the bridge, and/or two $L_3$ ligands form the bridge. The bridge may be organic, siloxane, siloxane-organic, etc. A specific example of such a bridge is NC $(CH_2)_{d'}SiR_2O(SiR_2O)_{f'}SiR_2(CH_2)_{d'}CN$, where each N is complexed with a metal atom, each R is independently selected and defined above, d' is independently selected from 1 to 20, alternatively from 1-10, alternatively from 1-5, and e' is from greater than 0 to 1,000. For example, in such an embodiment, the metal ligand complex may have general formula $[YML_3L_2NC(CH_2)_{d'}SiR_2O(SiR_2O)_{f'}SiR_2(CH_2)_{d'}CNL_2L_3MY]^{2+}[X]^{2-}$, where Y, M, $L_3$, $L_2$, d' R, f' and X are defined above.

Alternatively or in addition, the bridge may include branching, including via T and/or Q siloxy units. For example, the metal-ligand complex may be a solid supported catalyst which may be removed from the curable composition or cured product thereof via filtration or other techniques.

In specific embodiments, relative to the general formula above of one example of the metal-ligand complex, each of $L_1$-$L_3$ is an independently selected neutral ligand. Examples thereof include: those of formula $Y^1CN$, where $Y^1$ is selected from a substituted or unsubstituted hydrocarbyl group, a silyl group, a siloxy group, and an alkoxy group; pyridine; ammonia; those of formula $P(R^{15})_3$ and/or $P(OR^{15})_3$, where $R^{15}$ is an independently selected hydrocarbyl group; and carbon monoxide. In certain embodiments, each of $L_1$-$L_3$ is independently of formula $Y^1CN$, where each $Y^1$ independently is a $C_1$-$C_{22}$, alternatively a $C_1$-$C_{12}$, alkyl group.

In certain embodiments, one or more of $L_1$-$L_3$ may be an independently selected anionic ligand, such as halogens (e.g. iodo, bromide, chloride, fluoride), sulfide, thiocyanate, nitrate, azide, hydroxide, oxalate, nitrile, isothiocyanate, nitrile, and cyanade. As understood in the art, when the metal-ligand complex comprises one or more anionic ligands, the metal-ligand complex may not include a counter anion, represented by X in the general formula above. For example, the metal-ligand complex may merely have the formula $YML_1L_2L_3$.

X is not limited, and may be any anion. Suitable anions include halides, sulfonates (e.g., tosylate), borates, phosphates, antimonates, and the like. In certain embodiments, X is selected from a halide, trifluoromethylsulfonate (OTf$^-$), tetrafluoroborate (BF$_4^-$), hexafluorophosphate (PF$_6^-$), tetrakis[3,5-bis(trifluoromethyl)phenyl]borate ($[\{3,5-(CF_3)_2C_6H_3\}_4B]^-$), tetrakis(pentafluorophenyl)borate ($(F_5C_6)_4B^-$) and hexafluoroantimonate (SbF$_6^-$).

Specific examples of such catalysts include [Cp*Ru(MeCN)$_3$]PF$_6$, [CpRu(MeCN)$_3$]PF$_6$, [Cp*Ru(MeCN)$_3$]OTf, [Cp*Ru(MeCN)$_3$]BF$_4$, [Cp*Ru(MeCN)$_3$]SbF$_6$, [Cp*Ru(MeCN)$_2$(C$_{11}$H$_{23}$CN)]OTf, [Cp*Ru(MeCN)(C$_{11}$H$_{23}$CN)$_2$]OTf, and [Cp*Ru(C$_{11}$H$_{23}$CN)$_3$]OTf, where Cp indicates a cyclopentadienyl group, and Cp* indicates a pentamethylcyclopentadienyl group.

Other examples of suitable catalysts as component (E) include [Cp*RuCl$_2$], [Cp*RuCl]$_4$, [Cp*Ru(MeCN)$_2$Cl], Cp*Ru(COD)Cl, [Cp*Ru(COD)(MeCN)]PF$_6$, and Cp*Ru(PPh$_3$)$_2$Cl, where Cp and Cp* are defined above, Me indicates methyl, Ph indicates phenyl, and COD indicates cyclooctadiene.

Alternatively or in addition to the metal complexes described above, the (E) catalyst may alternatively be a Lewis acid. Examples of suitable Lewis acids include metal salts (e.g. copper salts, zinc salts, scandium salts, aluminum salts, etc.), compounds comprising boron and/or aluminum (e.g. triethyl borane, tris(pentafluorophenyl)borane), azoisobutyronitrile, 1,1'-azobis(cyclo-hexanecarbonitrile), and combinations thereof. Typically, the Lewis acid is utilized as the (E) catalyst for those (D) hydrosilylation-reaction inhibitors including a maleate group, which is typically deactivated via conjugate hydrosilylation by the Lewis acid. However, the Lewis acid may be utilized as the (E) catalyst for those (D) hydrosilylation-reaction inhibitors including other functionalities, e.g. an alkyne group.

Combinations of different compounds may be utilized together as the (E) catalyst. The (E) catalyst is typically present in the curable composition in an effective amount to deactivate the (D) hydrosilylation-reaction inhibitor at the elevated temperature. The elevated temperature is from 50 to 120, alternatively from 50 to 110, alternatively from 50 to 100, alternatively from 50 to 90, alternatively from 55 to 85, alternatively from 60 to 80, alternatively from 65 to 75, alternatively from 67.5 to 72.5, ° C. The effective amount of the (E) catalyst is contingent on the selection of the (D) hydrosilylation-reaction inhibitor, the (E) catalyst, the desired elevated temperature, and other parameters, which can be readily determined via routine experimentation. In certain embodiments, the effective amount of the (E) catalyst in the curable composition is greater than 0.01 ppm, and may be greater than 1,000 ppm (e.g., up to 10,000 ppm or more). In certain embodiments, the typical catalytic amount of the (E) catalyst is less than 5,000 ppm, alternatively less than 2,000 ppm, alternatively less than 1,000 ppm (but in any case greater than 0 ppm). In specific embodiments, the catalytic amount of the (E) catalyst may range from 0.01 to 1,000 ppm, alternatively 0.01 to 500 ppm, and alternatively 0.01 to 250 ppm, based on the weight of the curable composition. When the (E) catalyst comprises the metal-ligand complex, these ranges typically refer to the metal content of the metal ligand complex only.

The curable composition may further comprise one or more optional components, including adhesion promoters, carrier vehicles, dyes, pigments, anti-oxidants, heat stabilizers, flame retardants, flow control additives, biocides, fillers (including extending and reinforcing fillers), surfactants, thixotroping agents, water, carrier vehicles or solvents, pH buffers, etc. The curable composition may be in any form and may be incorporated into further compositions, e.g. as a component of a composition. For example, the curable composition may be in the form of, or incorporated into, an emulsion. The emulsion may be an oil-in-water emulsion, water-in-oil emulsion, silicone-in-oil emulsion, etc. The curable composition itself may be a continuous or discontinuous phase of such an emulsion.

Suitable carrier vehicles include silicones, both linear and cyclic, organic oils, organic solvents and mixtures of these. Specific examples of solvents may be found in U.S. Pat. No. 6,200,581, which is hereby incorporated by reference for this purpose.

Typically, the carrier vehicle, if present, is an organic liquid. Organic liquids includes those considered oils or solvents. The organic liquids are exemplified by, but not limited to, aromatic hydrocarbons, aliphatic hydrocarbons, alcohols having more than 3 carbon atoms, aldehydes, ketones, amines, esters, ethers, glycols, glycol ethers, alkyl halides and aromatic halides. Hydrocarbons include, isododecane, isohexadecane, Isopar L (C11-C13), Isopar H(C11-C12), hydrogentated polydecene. Ethers and esters include, isodecyl neopentanoate, neopentylglycol heptanoate, glycol distearate, dicaprylyl carbonate, diethylhexyl carbonate, propylene glycol n butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, and octyl palmitate. Additional organic carrier fluids suitable as a stand-alone compound or as an ingredient to the carrier fluid include fats, oils, fatty acids, and fatty alcohols. The carrier vehicle may also be a low viscosity organopolysiloxane or a volatile methyl siloxane or a volatile ethyl siloxane or a volatile methyl ethyl siloxane having a viscosity at 25° C. in the range of 1 to 1,000 mm$^2$/sec, such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, and any mixtures thereof.

The curable composition may be prepared by combining components (A)-(E), along with any optional components, in any order of addition, optionally with a master batch, and optionally under shear.

The present invention also provides a process of preparing a coated substrate with the curable composition. The method comprises disposing the curable composition on the substrate. The method further comprises curing the curable composition on the substrate at an elevated temperature of from 50 to 120° C. to give the coated substrate.

The curable composition may be disposed or dispensed on the substrate in any suitable manner. Typically, the curable composition is applied in wet form via a wet coating technique. In certain embodiments, the curable composition is applied by i) spin coating; ii) brush coating; iii) drop coating; iv) spray coating; v) dip coating; vi) roll coating; vii) flow coating; viii) slot coating; ix) gravure coating; or x) a combination of any of i) to ix). Typically, disposing the curable composition on the substrate results in a wet deposit on the substrate, which is subsequently cured to give the coated substrate, which comprises a cured film formed from the curable composition on the substrate.

The substrate is not limited and may be any substrate. The cured film may be separable from the substrate or may be physically and/or chemically bonded to the substrate depending on its selection. The substrate may have an integrated hot plate or an integrated or stand-alone furnace for curing the deposit. The substrate may optionally have a continuous or non-continuous shape, size, dimension, surface roughness, and other characteristics. In certain embodiments, the substrate has a softening point temperature at the elevated temperature. However, the curable composition and method are not so limited.

In certain embodiments, the substrate comprises a plastic, which maybe a thermosetting and/or thermoplastic. However, the substrate may alternatively be glass, metal, paper, wood, cardboard, paperboard, a silicone, or other materials, or a combination thereof.

Specific examples of suitable substrates include polyamides (PA); polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyvinyl alcohols (PVA); polyetheretherketones (PEEK); polyetherketoneketones (PEKK); polyarylates (PAR); polyethernitriles (PEN); phenolic resins; phenoxy resins; celluloses such as triacetylcellulose, diacetylcellulose, cellophane, etc.; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

The curable composition, or wet deposit, is typically cured at the elevated temperature for a period of time. The period of time is typically sufficient to effect curing, i.e., cross-linking, of the curable composition. In certain embodiments, the period of time is from greater than 0 to 8 hours, alternatively from greater than 0 to 2 hours, alternatively from greater than 0 to 1 hour, alternatively from greater than 0 to 30 minutes, alternatively from greater than 0 to 15 minutes, alternatively from greater than 0 to 10 minutes, alternatively from greater than 0 to 5 minutes, alternatively from greater than 0 to 2 minutes. The period of time is contingent on the elevated temperature utilized, desired film thickness, the presence of absence of any water or carrier vehicle in the curable composition, etc.

Curing the curable composition typically has a dwell time of from 1 and 50 seconds; alternatively from 2 to 10 seconds. Dwell time, as used herein, refers to the time during which the curable composition, or wet deposit, is subjected to the elevated temperature. Dwell time is distinguished from cure time, as there may be ongoing curing even after the curable composition, wet deposit, or partially cured reaction intermediary thereof is no longer subjected to the elevated temperature, which typically initiates curing. In certain embodiments, the coated article is prepared on a conveyor belt in an oven, and the dwell time may be calculated by dividing a length of the oven (e.g. in meters) by a line speed of the conveyor belt (e.g. in meters/sec).

The period of time may be broken down into cure iterations, e.g. a first-cure and a post-cure, with the first-cure being, for example, one hour and the post cure being, for example, three hours. The elevated temperature may be independently selected from any temperature above room temperature in such iterations, and may be the same in each iteration.

Depending on a thickness and other dimensions of the film and coated substrate, the coated substrate can be formed via an iterative process. For example, a first deposit may be formed and subjected to a first elevated temperature for a first period of time to give a partially cured deposit. Then, a second deposit may be disposed on the partially cured deposit and subjected to a second elevated temperature for a second period of time to give a second partially cured deposit. The partially cured deposit will also further cure during exposure to the second elevated temperature for the second period of time. A third deposit may be disposed on the second partially cured deposit and subjected to a third elevated temperature for a third period of time to give a third partially cured deposit. The second partially cured deposit will also further cure during exposure to the second elevated temperature for the second period of time. This process may be repeated, for example, from 1 to 50 times, to build the coated article as desired. A composite is of partially cured layers is typically subjected to a final post-cure, e.g. at the elevated temperature and period of time above. Each elevated temperature and period of time may be independently selected and may be the same as or different from one another. When the article is formed via the iterative process, each deposit may also be independently selected and may differ in terms of components selected in the composition and/or their amounts. Alternatively still, each iterative layer may be fully cured, rather than only being partially cured, in such an iterative process.

In certain embodiments, the deposit comprises a wet film. In these embodiments, the iterative process may be wet-on-wet, depending on a cure state of the partially cured layer. Alternatively, the iterative process may be wet-on-dry.

The coated substrate, which comprises the film formed from the curable composition on the substrate, may have varying dimensions, including relative thicknesses of the film and the substrate. The film has a thickness that may vary depending upon its end use application. Typically, the film has a thickness of from greater than 0 to 4,000 micrometers ($\mu$m), alternatively from greater than 0 to 3,000 micrometers ($\mu$m), alternatively from greater than 0 to 2,000 micrometers ($\mu$m), alternatively from greater than 0 to 1,000 micrometers ($\mu$m), alternatively from greater than 0 to 500, alternatively from greater than 0 to 250, micrometers ($\mu$m). However, other thicknesses are contemplated, e.g. from 0.1 to 200 $\mu$m. For example, the thickness of the film may be from 0.2 to 175 $\mu$m; alternatively from 0.5 to 150 $\mu$m; alternatively from 0.75 to 100 $\mu$m; alternatively from 1 to 75 $\mu$m; alternatively from 2 to 60 $\mu$m; alternatively from 3 to 50 $\mu$m; alternatively from 4 to 40 $\mu$m; alternatively any one of 1, 2, 3, 4, 5, 6, 7, 8, 9, 10, 15, 20, 25, 30, 35, 40, 45, 50, 60, 70, 75, 80, 90, 100, 150, 175, and 200 $\mu$m. In specific embodiments in which the substrate is plastic, the film has a thickness of from greater than 0 to 200, alternatively from greater than 0 to 150, alternatively from greater than 0 to 100, $\mu$m. In specific embodiments when the substrate is paper, and when the curable composition is formed as an emulsion, the film has a thickness of from greater than 0 to 20, alternatively from greater than 0 to 15, alternatively from greater than 0 to 10, alternatively from 0.2 to 5.0, $\mu$m.

If desired, the film may be subjected to further processing depending upon its end use application. For example, the film may be subjected to oxide deposition (e.g. $SiO_2$ deposition), resist deposition and patterning, etching, chemical or plasma stripping, metallization, or metal deposition. Such further processing techniques are generally known. Such deposition may be chemical vapor deposition (including low-pressure chemical vapor deposition, plasma-enhanced chemical vapor deposition, and plasma-assisted chemical vapor deposition), physical vapor deposition, or other vacuum deposition techniques. Many such further processing techniques involve elevated temperatures, particularly vacuum deposition, for which the film is well suited in view of its excellent thermal stability. Depending on an end use of the film, however, the film may be utilized with such further processing.

The coated substrate may be utilized in diverse end use applications. For example, the coated substrate may be utilized in coating applications, packaging applications, adhesive applications, fiber applications, fabric or textile applications, construction applications, transportation applications, electronics applications, electrical applications, photonics applications, etc. However, the curable composition may be utilized in end use applications other than preparing the coated substrate, e.g. in the preparation of articles, such as silicone rubbers.

The coated substrate may be utilized as a release liner, e.g. for a tape or adhesive, including any pressure-sensitive adhesives, including acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Each major surface of the substrate may having a film disposed thereon for double sided tapes or adhesives.

Embodiment 1 relates to a curable composition, comprising:
(A) an organopolysiloxane containing at least two silicon-bonded aliphatically unsaturated groups per molecule;
(B) an organohydrogensiloxane containing at least two silicon-bonded hydrogen atoms per molecule;
(C) a hydrosilylation-reaction catalyst;
(D) a hydrosilylation-reaction inhibitor; and
(E) a catalyst different from component (C) and capable of deactivating the (D) hydrosilylation-reaction inhibitor at an elevated temperature of from 50 to 120° C. such that components (A) and (B) react in the presence of at least component (C) at the elevated temperature.

Embodiment 2 relates to the curable composition of Embodiment 1, wherein component (D) comprises: (i) an alkene group; (ii) an alkyne group; (iii) an unsaturated ester; or (iv) any combination of (i) to (iii).

Embodiment 3 relates to the curable composition of Embodiments 1 or 2, wherein component (D) comprises the alkyne group, and component (D) is an alkyne alcohol; alternatively component (D) is 1-ethynyl-1-cyclohexanol.

Embodiment 4 relates to the curable composition of any one of Embodiments 1-3, wherein: (i) component (C) comprises a Group VIII to Group XI transition metal; (ii) component (E) comprises at least one of Rh, Pt, Fe, Co, Ni, Ti, Y, Pd, Au and Ru, alternatively comprises Ru; or (iii) both (i) and (ii).

Embodiment 5 relates to the curable composition of any one of Embodiments 1-3, wherein component (E) comprises: (i) a metal-ligand complex; (ii) a Lewis acid salt; (iii) Ru having an oxidation state of from −2 to +6, alternatively from −2 to +2; or (iv) any combination of (i) to (iii).

Embodiment 6 relates to the curable composition of Embodiment 5, wherein component (E) comprises said metal-ligand complex, and said metal-ligand complex has general formula (i) $[YML_1L_2L_3]^+[X]^-$ or (ii) $[YML_3L_2L_1L_1L_2L_3MY]^{2+}[X]^{2-}$ where Y is a substituted or unsubstituted cyclopentadienyl group of formula $C_5R^{10}R^{11}R^{13}R^{13}R^{14}$, where each of $R^{10}$-$R^{14}$ is independently selected from H, substituted or unsubstituted hydrocarbyl groups, silyl groups, siloxy groups, and alkoxy groups; M is a metal selected from Rh, Pt, Fe, Co, Ni, Ti, Y, Pd, Au and Ru; each of $L_1$-$L_3$ is an independently selected ligand; and X is an anion; and wherein in general formula (ii), two or more ligands may form a single bridge complexed with each M.

Embodiment 7 relates to the curable composition of Embodiment 6, wherein (i) M is Ru, each of $L_1$-$L_3$ is an independently selected neutral monodentate ligand, and X is selected from a halide, trifluoromethylsulfonate (OTf$^-$), tetrafluoroborate (BF$_4^-$), hexafluorophosphate (PF$_6^-$), and hexafluoroantimonate (SbF$_6^-$) or (ii) M is Ru, each of $L_1$-$L_3$ is a nitrile of formula Y$^1$CN, where Y$^1$ is selected from a substituted or unsubstituted hydrocarbyl group, a silyl group, a siloxy group, and an alkoxy group, and X is selected from a halide, trifluoromethylsulfonate (OTf$^-$), tetrafluoroborate (BF$_4^-$), hexafluorophosphate (PF$_6^-$), tetrakis(pentafluorophenyl)borate (($F_5C_6)_4B^-$), tetrakis[3,5-bis(trifluoromethyl)phenyl]borate ((${3,5-(CF_3)_2C_6H_3}_4B]^-$), and hexafluoroantimonate (SbF$_6^-$).

Embodiment 8 relates to a process of preparing a coated substrate with a curable composition, said process comprising:
disposing the curable composition on the substrate; and
curing the curable composition on the substrate at an elevated temperature of from 50 to 120° C. to give the coated substrate;
wherein the curable composition is the curable composition of any one of Embodiments 1-7.

Embodiment 9 relates to the process of Embodiment 8, wherein curing the curable composition has a dwell time of from 1 and 50 seconds; alternatively from 2 to 10 seconds.

Embodiment 10 relates to use of the coated substrate prepared in accordance with the method of Embodiment 8 in coating, packaging, or adhesive applications.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

Practical Examples 1-4

Various curable compositions are prepared in accordance with the subject disclosure. In particular, different curable compositions are prepared as described below, with each curable composition comprising: (A) an organopolysiloxane containing at least two silicon-bonded aliphatically unsaturated groups per molecule; (B) an organohydrogensiloxane containing at least two silicon-bonded hydrogen atoms per molecule; (C) a hydrosilylation-reaction catalyst; (D) a hydrosilylation-reaction inhibitor; and (E) a catalyst different from component (C) and capable of deactivating the (D) hydrosilylation-reaction inhibitor at an elevated temperature of from 50 to 120° C.

Table 1 below illustrates the components utilized to prepare 4 different curable compositions, along with their respective amounts. In each of the Examples below, the (A) organopolysiloxane containing at least two silicon-bonded aliphatically unsaturated groups per molecule, (B) organohydrogensiloxane containing at least two silicon-bonded hydrogen atoms per molecule (32.35 g), and (D) hydrosilylation-reaction inhibitor (1-ethynyl-1-cyclohexanol (ETCH), 1.01 g) are combined to form mixtures (SiH/Vi mol/mol=2/1). The (B) organohydrogensiloxane in each of the curable composition is a trimethylsiloxy-terminated dimethyl methyl hydrogen siloxane having a DP of 60 and having an SiH content of 1.05 wt. %. Each of the mixtures is then stirred intensively via a mechanical stirrer. The (C) hydrosilylation-reaction catalyst (100 ppm Pt) is then added to each of the mixtures, and the contents of each container are stirred intensively via a mechanical stirrer. The (E) catalyst different from component (C) (dissolved in 20 grams of the (A) organopolysiloxane) is then added to each of the containers, and the contents of each container are again stirred intensively via a mechanical stirrer to form four curable compositions.

After preparing Practical Examples 1-4, a portion (500 grams) of each of the curable compositions is plated onto each of two substrates (Innovia BOPP C200) to form 4 pairs of coated substrates with a 3 roll off-set gravure coater. One coated substrate from each pair is cured at 85° C. with a 2 second dwell time in an oven. The other coated substrate from each pair is cured at 85° C. with a 4 second dwell time in an oven. Each of the 8 cured coated substrates is then analyzed to determine the weight percent extractables (extractable percentage) and rub-off-resistance [ROR %]. It is generally desirable to minimize the extractable percentage and maximize the ROR %.

The extractable percentage is the amount of non-cross-linked silicone that disengages from the cured coated substrate in the presence of a solvent. The extractable percentage is measured as soon as the coated substrate exits the oven. From each coated substrate, 3 sample discs are prepared with a 1⅜ inch die cutter. The silicone present in each sample disc of the coated substrate is then determined via an Oxford Instruments Lab-X 3500 Benchtop XRF analyzer, which relies on X-ray fluorescence. Each of the 3 sample discs is then placed in individual 100 mL bottles containing 40 mL of solvent, methyl isobutyl ketone (MIBK) in a manner to not disturb the 3 sample discs. Each bottle is then covered and left to rest for 30 minutes, after which each of the 3 sample discs is removed from the bottles and placed on tissue paper, with the substrate on the tissue paper. The MIBK is allowed to evaporate from the 3 sample discs at ambient conditions. The final weight of each sample disc is then measured. The extractable percentage is calculated as follows:

$$\text{Extractable \%} = \frac{W_i - W_f}{W_i} \times 100\%$$

where $W_i$ is the initial coat weight (before MIBK) and $W_f$=final coat weight (after MIBK).

The ROR % test measures the amount of cured silicone left after the coated substrate is subjected to surface abrasion. It denotes how strong the cured coating film is anchored to the substrate; a higher ROR % is desirable. The ROR % is measured as soon as the coated substrate exits the curing oven. From each coated substrate, 2 sample discs are prepared and the silicone present in each sample disc of the coated substrate is then determined via an Oxford Instruments Lab-X 3500 Benchtop XRF analyzer, which relies on X-ray fluorescence. Each sample disc of the coated substrate is then subjected to an abrasion test under a load of 1.9 kg and in contact with a felt using an automated abrading equipment, a test being similar to the 'Taber-type method'. The ROR % or anchorage index is calculated as follows:

TABLE 1

| P.E. | Component (A) | Amount (g) | Component (E) | Amount (g) |
| --- | --- | --- | --- | --- |
| PE1 | Organopolysiloxane 1 | 445.0 | [Cp*Ru(MeCN)$_3$]$^+$OTf$^-$ | 0.25 |
| PE2 | Organopolysiloxane 1 | 437.0 | [Cp*Ru(MeCN)$_2$(C$_{11}$H$_{23}$CN)]$^+$OTf$^-$ | 0.32 |
| PE3 | Organopolysiloxane 1 | 437.0 | [Cp*Ru(MeCN)(C$_{11}$H$_{23}$CN)$_2$]$^+$OTf$^-$ | 0.39 |
| PE4 | Organopolysiloxane 1 | 437.0 | [Cp*Ru(C$_{11}$H$_{23}$CN)$_3$]$^+$OTf$^-$ | 0.46 |

Organopolysiloxane 1 is dimethylhexenyl-terminated dimethyl methylhexenyl siloxane having a DP of 150 and a vinyl content of 0.95 wt. %.

In table 1 above, Cp* indicates pentamethylcyclopentadienyl group, Cp indicates a cyclopentadienyl group, and Me indicates methyl.

$$ROR \% = \left(\frac{W_{f'}}{W_{i'}}\right) \times 100\%$$

where $W_{i'}$ is the initial coat weight (before abrasion) and $W_{f'}$=final coat weight (after abrasion).

The results of these analyses are set forth in Table 2 below.

TABLE 2

| Practical Example | 2 Second Dwell Time | | 4 Second Dwell Time | |
|---|---|---|---|---|
| | Extractable % | ROR % | Extractable % | ROR % |
| PE1 | 22.6 | 56.7 | 8.4 | 94.3 |
| PE2 | 26.9 | 48.4 | 9.8 | 92.5 |
| PE3 | 20.8 | 72.2 | 8.0 | 94.4 |
| PE4 | 21.6 | 62.3 | 9.2 | 95.3 |

Practical Examples 5-7

Additional curable compositions are prepared in accordance with the subject disclosure. In particular, different curable compositions are prepared as described below, with each curable composition comprising: (A) an organopolysiloxane containing at least two silicon-bonded aliphatically unsaturated groups per molecule; (B) an organohydrogensiloxane containing at least two silicon-bonded hydrogen atoms per molecule; (C) a hydrosilylation-reaction catalyst; (D) a hydrosilylation-reaction inhibitor; and (E) a catalyst different from component (C) and capable of deactivating the (D) hydrosilylation-reaction inhibitor at an elevated temperature of from 50 to 120° C.

Table 3 below illustrates the components utilized to prepare 3 different curable compositions, along with their respective amounts. In each of the Examples below, the (A) organopolysiloxane containing at least two silicon-bonded aliphatically unsaturated groups per molecule, (B) organohydrogensiloxane containing at least two silicon-bonded hydrogen atoms per molecule (1.6 g), and (D) hydrosilylation-reaction inhibitor (1-ethynyl-1-cyclohexanol (ETCH), 50 mg) are combined to form mixtures (SiH/Vi mol/mol=2/1). The (B) organohydrogensiloxane in each of the curable composition is the same as that above for Practical Examples 1-4. Each of the mixtures is then stirred intensively via a mechanical stirrer. The (C) hydrosilylation-reaction catalyst (100 ppm Pt) is then added to each of the mixtures, and the contents of each container are stirred intensively via a mechanical stirrer. The (E) catalyst different from component (C) is then added to each of the containers, and the contents of each container are again stirred intensively via a mechanical stirrer to form four curable compositions. The (E) catalyst utilized in Practical Examples 5-7 has the following general formula: [Cp*Ru(MeCN)$_2$NCH$_2$CH$_2$CH$_2$CSiMe$_2$O(SiMe$_2$O)$_{n'}$SiMe$_2$CH$_2$CH$_2$CH$_2$CN(MeCN)$_2$RCp*]$^{2+}$2[OTf]$^-$, where Me indicates methyl and n' is set forth in Table 3 for each Practical Example.

TABLE 3

| Practical Example | Component (A) | Amount (g) | n' of Component (E) | Amount (mg) |
|---|---|---|---|---|
| PE5 | Organopolysiloxane 2 | 50.0 | 5-9 | 12 |
| PE6 | Organopolysiloxane 2 | 50.0 | 56 | 38 |
| PE7 | Organopolysiloxane 2 | 50.0 | 243 | 133 |

Organopolysiloxane 2 is a vinyl-functional polysiloxane having a DP of 160, a Q siloxy unit, and containing 0.9% vinyl.

After preparing Practical Examples 5-7, a portion of each of the curable compositions is plated onto a substrate (Innovia BOPP C200) to form coated substrates via a EUCLID handsheet coater from Euclid Coating Systems, Inc. of Bay City, Mich. Each coated substrate is placed onto hard paperboard and cured at 85° C. via a bluemax coater with an 11 second dwell time. Each coated substrates is then analyzed to determine the weight percent extractables (extractable percentage) and rub-off-resistance [ROR %] in accordance with the techniques described above. The results are set forth below in Table 4.

TABLE 4

| Practical Example | Extractable % | ROR % |
|---|---|---|
| PE5 | 13.3 | 49.4 |
| PE6 | 7.3 | 53.6 |
| PE7 | 11.8 | 91.4 |

Comparative Example 1

A comparative curable composition is prepared without the (E) catalyst. In particular, the comparative curable composition comprises: (A) 457.0 grams of the Organopolysiloxane 1; (B) 32.35 grams of the organohydrogensiloxane; (C) 100 ppm platinum catalyst; and (D) 1.01 grams of the hydrosilylation-reaction inhibitor (1-ethynyl-1-cyclohexanol (ETCH). The comparative curable composition is prepared in the manner described above relative to Practical Examples 1-4 (but for exclusion of the (E) catalyst) and utilized to prepare a comparative coated substrate according to the method described above. Extractable percentage and ROR % of the comparative coated substrate is measured according to the technique described above to determine properties of the comparative coated substrate. The results of these analyses are set forth in Table 5 below.

TABLE 5

| Curable Composition | 2 Second Dwell Time | | 4 Second Dwell Time | |
|---|---|---|---|---|
| | Extractable % | ROR % | Extractable % | ROR % |
| CE1 | 43.5 | 39.6 | 22.4 | 77.0 |

As made clear in Table 3 above, the comparative coated substrate had an undesirable extractable percentage and ROR % as compared to the coated substrates prepared in accordance with Practical Examples 1-7.

Comparative Example 2

Another comparative curable composition is prepared without the (E) catalyst. In particular, this comparative curable composition is the same as that of Practical Example 5 but without the (E) catalyst. This comparative curable composition is prepared in the manner described above relative to Practical Examples 1-4 (but for exclusion of the (E) catalyst) and utilized to prepare another comparative coated substrate according to the method described above for Practical Examples 5-7. The comparative coated substrate is cured at 85° C. with an 11 second dwell time as described above for Practical Examples 5-7. Extractable percentage and ROR % of the comparative coated substrate is measured according to the technique described above to determine properties of the comparative coated substrate. The results of these analyses are set forth in Table 6 below.

TABLE 6

| Curable Composition | 11 Second Dwell Time | |
| --- | --- | --- |
| | Extractable % | ROR % |
| CE2 | 9.5 | 38.7 |

As made clear in Table 6 above, the comparative coated substrate had an undesirable extractable percentage and ROR % as compared to the coated substrates prepared in accordance with Practical Examples 5 and 7.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A curable composition, comprising:
   (A) an organopolysiloxane containing at least two silicon-bonded aliphatically unsaturated groups per molecule;
   (B) an organohydrogensiloxane containing at least two silicon-bonded hydrogen atoms per molecule;
   (C) a hydrosilylation-reaction catalyst;
   (D) a hydrosilylation-reaction inhibitor; and
   (E) a catalyst different from component (C) and capable of deactivating the (D) hydrosilylation-reaction inhibitor at an elevated temperature of from 50 to 120° C. such that components (A) and (B) react in the presence of at least component (C) at the elevated temperature;
   wherein component (E) comprises a metal-ligand complex having general formula (i) [YML1L2L3]+[X]− or (ii) [YML3L2L1L1L2L3MY]2+[X]2−; where Y is a substituted or unsubstituted cyclopentadienyl group of formula C5R10R11R13R13R14, where each of R10-R14 is independently selected from H, substituted or unsubstituted hydrocarbyl groups, silyl groups, siloxy groups, and alkoxy groups; M is a metal selected from Rh, Pt, Fe, Co, Ni, Ti, Y, Pd, Au and Ru; each of L1-L3 is an independently selected ligand; and X is an anion; and wherein in general formula (ii), two or more ligands may form a single bridge complexed with each M.

2. The curable composition of claim 1, wherein component (D) comprises: (i) an alkene group; (ii) an alkyne group; (iii) an unsaturated ester; or (iv) any combination of (i) to (iii).

3. The curable composition of claim 1, wherein component (D) comprises the alkyne group, and component (D) is an alkyne alcohol.

4. The curable composition of claim 1, wherein: (i) component (C) comprises a Group VIII to Group XI transition metal; (ii) component (E) comprises Ru; or (iii) both (i) and (ii).

5. The curable composition of claim 1, wherein component (E) comprises Ru having an oxidation state of from −2 to +6.

6. The curable composition of claim 1, wherein (i) M is Ru, each of $L_1$-$L_3$ is an independently selected neutral monodentate ligand, and X is selected from a halide, trifluoromethylsulfonate (OTf−), tetrafluoroborate ($BF_4^-$), hexafluorophosphate ($PF_6^-$), and hexafluoroantimonate ($SbF_6^-$) or (ii) M is Ru, each of $L_1$-$L_3$ is a nitrile of formula $Y^1CN$, where $Y^1$ is selected from a substituted or unsubstituted hydrocarbyl group, a silyl group, a siloxy group, and an alkoxy group, and X is selected from a halide, trifluoromethylsulfonate (OTf−), tetrafluoroborate ($BF_4^-$), hexafluorophosphate ($PF_6^-$), tetrakis(pentafluorophenyl)borate (($F_5C_6)_4B^-$), tetrakis[3,5-bis(trifluoromethyl)phenyl]borate ((${3,5\text{-}(CF_3)_2C_6H_3}_4B]^-$), and hexafluoroantimonate ($SbF_6^-$).

7. A process of preparing a coated substrate with a curable composition, said process comprising:
   disposing the curable composition on the substrate; and
   curing the curable composition on the substrate at an elevated temperature of from 50 to 120° C. to give the coated substrate;
   wherein the curable composition is the curable composition of claim 1.

8. The process of claim 7, wherein curing the curable composition has a dwell time of from 1 and 50 seconds.

9. A release liner comprising the coated substrate prepared in accordance with the method of claim 7 for coating, packaging, or adhesive applications.

* * * * *